United States Patent
Hardman et al.

(10) Patent No.: US 8,560,625 B1
(45) Date of Patent: Oct. 15, 2013

(54) FACILITATING PHOTO SHARING

(75) Inventors: Cory Hardman, Westminster, CO (US); Vian Shah, Boulder, CO (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/602,134

(22) Filed: Sep. 1, 2012

(51) Int. Cl.
  *G06F 15/16* (2006.01)
  *G06K 9/00* (2006.01)
  *H04W 4/00* (2009.01)

(52) U.S. Cl.
  USPC ............. 709/206; 382/118; 455/456.1

(58) Field of Classification Search
  USPC ............. 709/206; 382/118; 455/456.1
  See application file for complete search history.

(56) References Cited

U.S. PATENT DOCUMENTS

| | | | |
|---|---|---|---|
| 7,945,653 | B2 | 5/2011 | Zuckerberg |
| 8,121,618 | B2 * | 2/2012 | Rhoads et al. ............. 455/456.1 |
| 2011/0211736 | A1 * | 9/2011 | Krupka et al. ................ 382/118 |
| 2012/0072493 | A1 | 3/2012 | Muriello |
| 2012/0076367 | A1 | 3/2012 | Tseng |
| 2012/0114199 | A1 * | 5/2012 | Panyam et al. ............... 382/118 |
| 2012/0144316 | A1 | 6/2012 | Deng |

* cited by examiner

*Primary Examiner* — Asghar Bilgrami
(74) *Attorney, Agent, or Firm* — IP Spring

(57) ABSTRACT

Embodiments generally relate to facilitating photo sharing among users of a social network system. In one embodiment, a method includes recognizing one or more people in a photo captured by a user. The method also includes sending a copy of the photo to at least one person recognized in the photo. The method also includes receiving, from the at least one person recognized in the photo, an indication of whether the at least one person approves the photo.

6 Claims, 3 Drawing Sheets

FACILITATING PHOTO SHARING

TECHNICAL FIELD

Embodiments relate generally to social network systems, and more particularly to facilitating photo sharing.

BACKGROUND

When people in a group want to take a group photo, different individuals in the group often want to take a group photo with their own personal cameras so that different individuals each have a copy of the group photo. Furthermore, after a photo is taken, some individuals in the group may want to see the photo to make sure that they like how they look in the photo. This requires a camera to be passed around so that individuals may approve the photo. Passing around a camera may disrupt the pose and formation of the people in the group. If the photo needs to be retaken, the group needs to reassemble for another photo.

SUMMARY

Embodiments generally relate to facilitating photo sharing among users of a social network system. In one embodiment, a method includes recognizing one or more people in a photo captured by a user. The method also includes sending a copy of the photo to at least one person recognized in the photo. The method also includes receiving, from the at least one person recognized in the photo, an indication of whether the at least one person approves the photo.

With further regard to the method, the recognizing is based at least in part on social connections. In one embodiment, the recognizing includes identifying one or more faces of the one or more people in the photo, and matching the one or more identified faces to respective faces of people who are socially connected to the user in a social network system. In one embodiment, the recognizing includes identifying at least one face, and applying a facial recognition algorithm to the at least one face. In one embodiment, the sending of the copy includes determining a device associated with the at least one person recognized in the photo, and sending the copy of the photo to the device. In one embodiment, the method also includes sending the indication to the user. In one embodiment, the method also includes sending to the user a prompt to capture a new photo in response to an indication that the at least one person disapproves the photo. In one embodiment, the method also includes enabling the user to associate identifying labels with unmatched faces. In one embodiment, the method also includes enabling the user to associate identifying labels with unrecognized faces by selecting people from a list of social connections in a social network. In one embodiment, the method also includes enabling the user to verify the correctness of people recognized in the photo.

In another embodiment, a method includes recognizing one or more people in a photo captured by a user, where the recognizing is based at least in part on social connections. The method also includes enabling the user to associate identifying labels with unrecognized faces by selecting people from a list of social connections in a social network, and sending a copy of the photo to at least one person recognized in the photo, where the sending of the copy includes determining a device associated with the at least one person recognized in the photo, and sending the copy of the photo to the device. The method also includes receiving, from the at least one person recognized in the photo, an indication of whether the at least one person approves the photo. In response to an indication that the at least one person disapproves the photo, the method also includes sending to the user a prompt to capture a new photo.

In another embodiment, a system includes one or more processors, and logic encoded in one or more tangible media for execution by the one or more processors. When executed, the logic is operable to perform operations including: recognizing one or more people in a photo captured by a user; sending a copy of the photo to at least one person recognized in the photo; and receiving, from the at least one person recognized in the photo, an indication of whether the at least one person approves the photo.

With further regard to the system, the recognizing is based at least in part on social connections. In one embodiment, the logic when executed is further operable to perform operations including identifying one or more faces of the one or more people in the photo, and matching the one or more identified faces to respective faces of people who are socially connected to the user in a social network system. In one embodiment, the logic when executed is further operable to perform operations including identifying at least one face, and applying a facial recognition algorithm to the at least one face. In one embodiment, the logic when executed is further operable to perform operations including determining a device associated with the at least one person recognized in the photo, and sending the copy of the photo to the device. In one embodiment, the logic when executed is further operable to perform operations including sending the indication to the user. In one embodiment, the logic when executed is further operable to perform operations including sending to the user a prompt to capture a new photo in response to an indication that the at least one person disapproves the photo. In one embodiment, the logic when executed is further operable to perform operations including enabling the user to associate identifying labels with unmatched faces. In one embodiment, the logic when executed is further operable to perform operations including enabling the user to associate identifying labels with unrecognized faces by selecting people from a list of social connections in a social network. In one embodiment, the logic when executed is further operable to perform operations including enabling the user to verify the correctness of people recognized in the photo.

DETAILED DESCRIPTION

Embodiments described herein relate to photo sharing among users of a social network system. In some embodiments, when a user of a camera device captures a photo of one or more people, a system recognizes one or more of the people in the photo. In some embodiments, the system recognizes people in the photo based at least in part on social connections between the people in the photo and the user who captured the photo. For example, the system may identify one or more faces of one or more people in the photo. The system may then match the identified faces to respective faces of people who are socially connected to the user in a social network system. In some embodiments, the system may enable the user to verify the correctness of people recognized in the photo. In some embodiments, the system may enable the user to associate identifying labels with unrecognized faces by selecting people from a list of social connections on the social network.

The system then shares the photo of one or more people in the photo by sending a copy of the photo to the one or more people recognized in the photo. In some embodiments, the sending of the copy may include the system determining a device such as a mobile phone associated with at least one person recognized in the photo, and then sending the copy of the photo to the device of the recognized person. The system then receives from the person recognized in the photo, an indication of whether the recognized person approves the photo. The system then sends the indication to the user who captured the photo. In response to an indication that the recognized person disapproves the photo, the system may then send to the user who captured the photo a prompt to capture a new photo.

Figure 1:
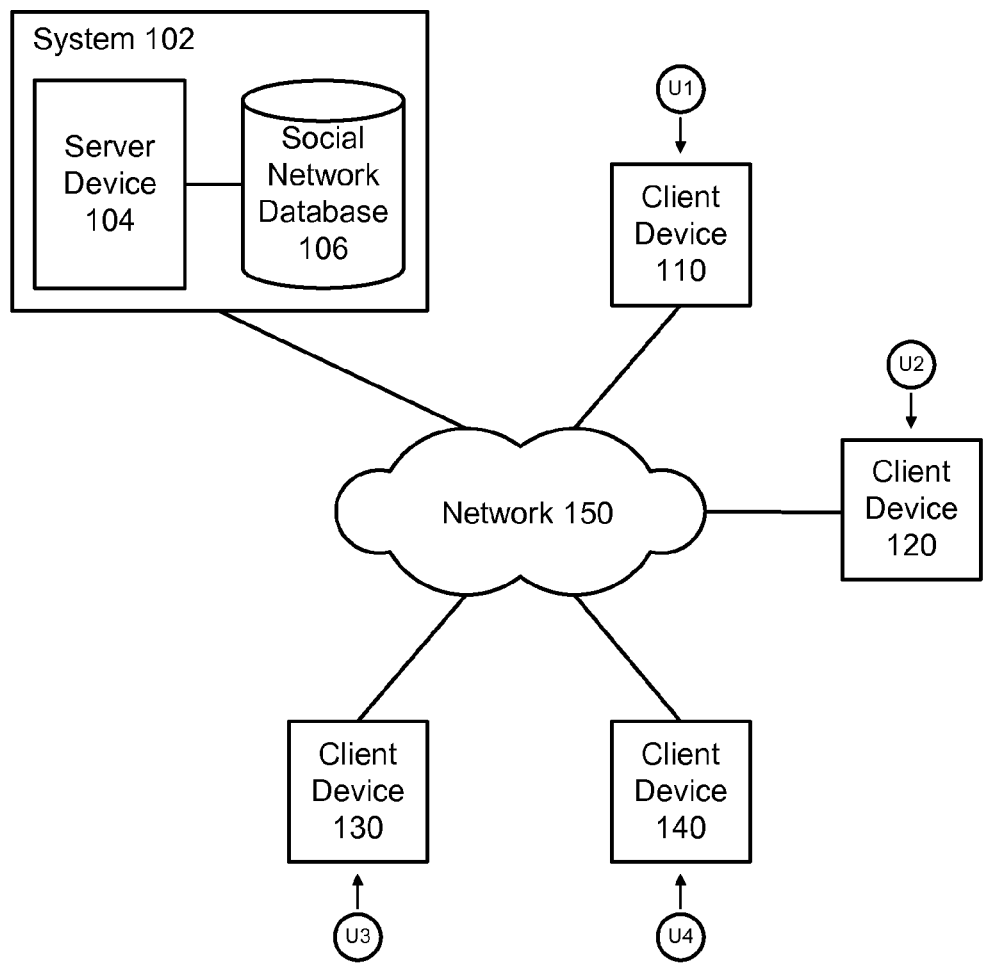
FIG. 1 illustrates a block diagram of an example network environment, which may be used to implement the embodiments described herein.

FIG. 1 illustrates a block diagram of an example network environment 100, which may be used to implement the embodiments described herein. In one embodiment, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other embodiments, network environment 100 may not have all of the components shown and/or may have other elements including other types of elements instead of, or in addition to, those shown herein.

In various embodiments, users U1, U2, U3, and U4 may take photos as well as receive photos for viewing and/or approval using respective client devices 110, 120, 130, and 140. Various hardware and software components used to implement embodiments described herein may reside on client devices 110, 120, 130, and 140, and client devices 110, 120, 130, and 140 may be any combination of smartphones, tablets, notebook computers, or any other suitable devices that include an Internet-connected camera.

As described in various embodiments herein, users U1, U2, U3, and U4 may represent members/individuals of a group participating in a group photo. In some embodiments, each individual in a group photo may participate in photo sharing and may be registered to a photo sharing service/social network. Each individual may also be socially connected to a given user taking one or more photos (e.g., the photographer) on the social network system.

Figure 2:
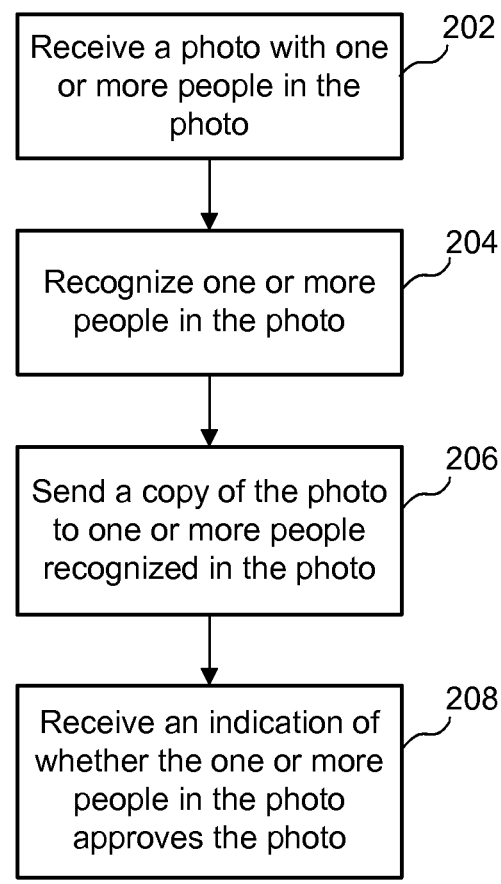
FIG. 2 illustrates an example simplified flow diagram for facilitating photo sharing among users of a social network system.

FIG. 2 illustrates an example simplified flow diagram for facilitating photo sharing among users of a social network system. Referring to both FIGS. 1 and 2, a method is initiated in block 202, where system 102 receives a photo with one or more people in a photo captured by a user. In various embodiments, the user may capture the photo using any suitable device such as a camera, smartphone, tablet, etc. In various embodiments, such a device is capable of connecting to the Internet after taking the photo. System 102 may receive the photo being uploaded (e.g., to the social network photo sharing service), and then may recognize the individuals in the photo.

In block 204, system 102 recognizes one or more people in a photo captured by a user. As described in more detail below, system 102 may apply a facial recognition algorithm to recognize the people in the photo. In various embodiments, system 102 enables users of the social network system to specify and/or consent to the use of personal information, which may include system 102 using their faces in photos or using their identity information in recognizing people identified in photos. For example, system 102 may provide users with multiple selections directed to specifying and/or consenting to the use of personal information. For example, selections with regard to specifying and/or consenting may be associated with individual photos, all photos, individual photo albums, all photo albums, etc. The selections may be implemented in a variety of ways. For example, system 102 may cause buttons or check boxes to be displayed next to various selections. In one embodiment, system 102 enables users of the social network to specify and/or consent to the use of using their photos for facial recognition in general. Example embodiments for recognizing faces and other objects are described in more detail below.

In some embodiments, the recognizing of people is based at least in part on social connections. For example, in some embodiments, system 102 may identify one or more faces of the one or more people in the photo. System 102 may then match the one or more identified faces to respective faces of people who are socially connected to the user in a social network system. In some embodiments, system 102 may match one or more identified faces to respective faces of people who are socially connected to one or more people already recognized in the photo. Matching faces of people based on social connection avoids system 102 needing to do a global match against everyone in the social network. In some embodiments, system 102 may, if needed, still perform a global match against people in the social network who are not socially connected to the user who captured the photo or connected to the people recognized in the photo.

In some embodiments, for faces which cannot be matched, the user who captured the photo may manually select the individuals from a list of friends on the social network system. For example, in some embodiments, system 102 may display a list of socially connected people (e.g., friends) identified in the photo. System 102 may then enable the user to verify the correctness of people recognized in the photo. This also allows the photo to be automatically tagged, which reduces the amount of manual work for the user who captured the photo. System 102 may also enable the user to edit any tags if needed. In some embodiments, system 102 enables the user to associate identifying labels with unrecognized faces by selecting people from a list of social connections in a social network. In some embodiments, system 102 enables the user who captured the photo as well as recipients of copies of the photo to associate identifying labels with unrecognized faces by selecting people from their lists of social connections in a social network. In some embodiments, a given user who associates an identifying label with an unrecognized face may be prompted to enter contact information (e.g., phone number, email address, etc.) in order to send a copy of the photo to that person. System 102 may then use the contact information to send subsequent photos to that person.

In some embodiments, system 102 may determine that one or more people identified in a given photo are not a part of the group. For example, a stranger may be captured in the background, and system 102 may determine that the stranger appears to be too far away (e.g., based on the relative size of the face) and/or looking in a different direction from the rest of the people in the group to be a part of the group. In some embodiments, system 102 may ignore the face during the recognition process or may prompt to the user who captured the photo to verify whether the person in question is a part of the group. In some embodiments, system 102 may not recognize the person in question, and the user would not manually associate an identifying label with the stranger. As such, system 102 may ignore the stranger during the recognition process of subsequent photos.

In block 206, system 102 sends a copy of the photo to one or more people recognized in the photo. In various embodiments, system 102 immediately sends a copy of the photo to the people in the photo, which enables the people recognized in the photo to seamlessly receive a copy of the photo to keep and/or to approve. As such, individuals in the photo might not have the desire to take another photo with their own personal camera, which may be unnecessary.

In some embodiments, system 102 may utilize an online registry service to automatically make the photo available to each person in the photo. If a given individual in the photo has a smartphone (or any other suitable device for receiving and view photos), that individual may nearly instantaneously view the photo. In some embodiments, in order send a copy of the photo to a given person recognized in the photo, system 102 may determine or locate a device associated with the given person recognized in the photo, and then send the copy of the photo to that device. In some embodiments, system 102 may utilize user profile information such as a phone number, email address, media access control (MAC) address, etc. associated with a given person recognized in the photo in order to send the photo to a device associated with that given person.

The recipients of the photo may then approve or disapprove the photo. This also enables the people in the photo to approve the image and share the image with their friends. In some embodiments, system 102 may send out a notification (which may be turned "on" by default) such that the device of each person who receives a copy will alert them that the photo has been shared with them to illicit their approval or disapproval of the photo. If one or more people disapprove the photo, another photo can be taken immediately before the people go "out of formation." System 102 may provide each person with one or more selections to approve or disapprove the photo.

In some embodiments, system 102 may prompt the user capturing the photo whether or not to share the photo with the group. Also, if the user takes the photo with him or herself in the photo (e.g., using a timer or having a stranger take the picture, etc.), system 102 may enable that user (e.g., owner of the camera device) to approve or disapprove the photo before anyone else looks at it.

In block 208, system 102 receives, from the at least one person recognized in the photo, an indication of whether the at least one person in the photo approves or disapproves the photo. In response to an indication that the at least one person disapproves the photo, in some embodiments, system 102 sends a prompt to the user to capture a new photo. Embodiments described herein render such passing around of a camera for different individuals to view and approve or disapprove unnecessary, as each individual would have already received a copy of the photo on their own devices (e.g., camera, smartphone, tablet, etc.).

In some embodiments, system 102 may apply various policies with regard to a given photo. For example, in some embodiments, if a person disapproves a given photo, system 102 may automatically prompt the user who captured the photo to take another photo. In some embodiments, a person who disapproves a photo may still keep the photo even though another photo may be taken. In some embodiments, a disapproval of a photo may cause system 102 to prevent the other people in the photo to keep a copy of the disapproved photo, or may otherwise delete the photo. Various policies are possible, depending on the particular implementations.

Although the steps, operations, or computations may be presented in a specific order, the order may be changed in particular embodiments. Other orderings of the steps are possible, depending on the particular implementation. In some particular embodiments, multiple steps shown as sequential in this specification may be performed at the same time.

While system 102 is described as performing the steps as described in the embodiments herein, any suitable component or combination of components of system 102 or any suitable processor or processors associated with system 102 may perform the steps described.

In various embodiments, system 102 may utilize a variety of recognition algorithms to recognize faces in photos. Such facial algorithms may be integral to system 102. System 102 may also access recognition algorithms provided by software that is external to system 102 and that system 102 accesses.

In various embodiments, system 102 obtains reference images of users of the social network system, where each reference image includes an image of a face that is associated with a known user. The user is known, in that system 102 has the user's identity information such as the user's name and other profile information. In one embodiment, a reference image may be, for example, a profile image that the user has uploaded. In one embodiment, a reference image may be based on a composite of a group of reference images.

In one embodiment, to recognize a face in a photo, system 102 may compare the face (i.e., image of the face) and match the face to reference images of users of the social network system. Note that the term "face" and the phrase "image of the face" are used interchangeably. For ease of illustration, the recognition of one face is described in some of the example embodiments described herein. These embodiments may also apply to each face of multiple faces to be recognized.

In one embodiment, system 102 may search reference images in order to identify any one or more reference images that are similar to the face in the photo.

In one embodiment, for a given reference image, system 102 may extract features from the image of the face in a photo for analysis, and then compare those features to those of one or more reference images. For example, system 102 may analyze the relative position, size, and/or shape of facial features such as eyes, nose, cheekbones, mouth, jaw, etc. In one embodiment, system 102 may use data gathered from the analysis to match the face in the photo to one more reference images with matching or similar features. In one embodiment, system 102 may normalize multiple reference images, and compress face data from those images into a composite representation having information (e.g., facial feature data), and then compare the face in the photo to the composite representation for facial recognition.

In some scenarios, the face in the photo may be similar to multiple reference images associated with the same user. As such, there would be a high probability that the person associated with the face in the photo is the same person associated with the reference images.

In some scenarios, the face in the photo may be similar to multiple reference images associated with different users. As such, there would be a moderately high yet decreased probability that the person in the photo matches any given person associated with the reference images. To handle such a situation, system 102 may use various types of facial recognition algorithms to narrow the possibilities, ideally down to one best candidate.

For example, in one embodiment, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the photo to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In one embodiment, system 102 may generate an output indicating a likelihood (or probability) that the face in the photo matches a given reference image. In one embodiment, the output may be represented as a metric (or numerical value) such as a percentage associated with the confidence that the face in the photo matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in one embodiment, the output may be a confidence score for matching.

Embodiments described herein provide various benefits. For example, embodiments enable users to immediate share photos with individuals in the photos. Individuals in the photos may quickly and conveniently receive copies of photos for approval or disapproval.

Figure 3:
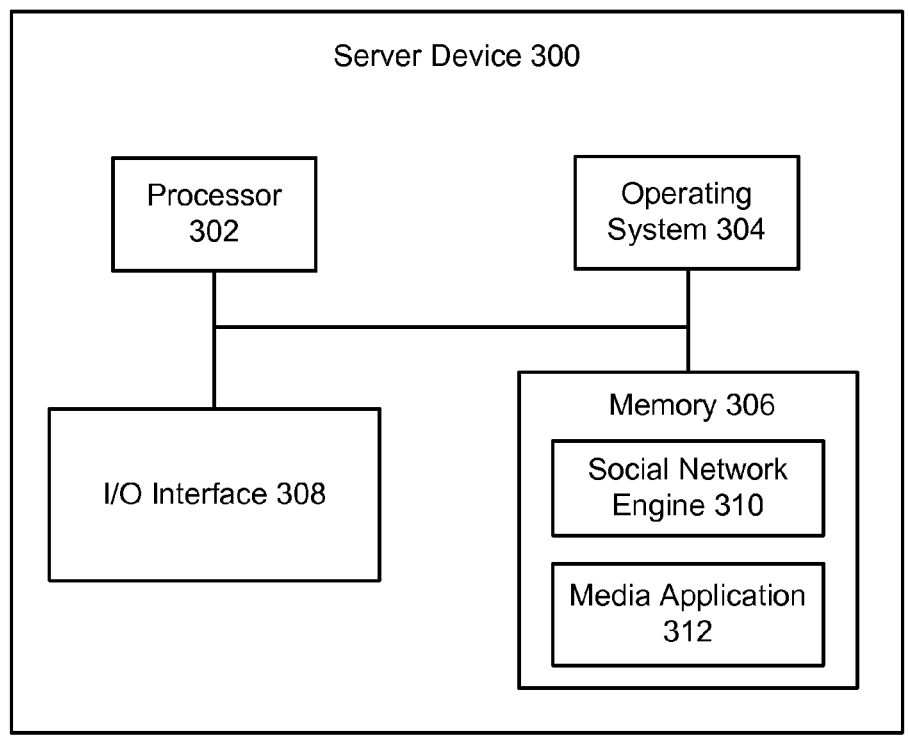
FIG. 3 illustrates a block diagram of an example server device, which may be used to implement the embodiments described herein.

FIG. 3 illustrates a block diagram of an example server device 300, which may be used to implement the embodiments described herein. For example, server device 300 may be used to implement server device 104 of FIG. 1, as well as to perform the method embodiments described herein. In one embodiment, server device 300 includes a processor 302, an operating system 304, a memory 306, and an input/output (I/O) interface 308. Server device 300 also includes a social network engine 310 and a media application 312, which may be stored in memory 306 or on any other suitable storage location or computer-readable medium. Media application 312 provides instructions that enable processor 302 to perform the functions described herein and other functions.

For ease of illustration, FIG. 3 shows one block for each of processor 302, operating system 304, memory 306, I/O interface 308, social network engine 310, and media application 312. These blocks 302, 304, 306, 308, 310, and 312 may represent multiple processors, operating systems, memories, I/O interfaces, social network engines, and media applications. In other embodiments, server device 300 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method comprising: recognizing one or more people from one or more faces in a photo including two or more faces captured by a user, wherein the recognizing is based at least in part on social connections, wherein the recognizing comprises: identifying the one or more faces of the one or more people in the photo; and applying a facial recognition algorithm to the one or more faces, wherein the facial recognition algorithm matches the one or more identified faces to respective faces of people who are socially connected to the user in a social network system; enabling the user to associate identifying labels with unrecognized faces by selecting people from a list of social connections in a social network; sending a copy of the photo to at least one person recognized in the photo, wherein the sending of the copy includes determining a device associated with the at least one person recognized in the photo, and sending the copy of the photo to the device; receiving, from the at least one person recognized in the photo, an indication of whether the at least one person approves the photo; and in response to an indication that the at least one person disapproves the photo, sending to the user a prompt to capture a new photo.

2. A method comprising: recognizing one or more people from one or more faces in a photo including two or more faces captured by a user, wherein the recognizing is based at least in part on social connections, wherein the recognizing comprises: identifying the one or more faces of the one or more people in the photo; and applying a facial recognition algorithm to the one or more faces, wherein the facial recognition algorithm matches the one or more identified faces to respective faces of people who are socially connected to the user in a social network system; enabling the user to associate identifying labels with unrecognized faces by selecting people from a list of social connections in a social network; sending a copy of the photo to at least one person recognized in the photo, wherein the sending of the copy includes determining a device associated with the at least one person recognized in the photo, and sending the copy of the photo to the device; receiving, from the at least one person recognized in the photo, an indication of whether the at least one person approves the photo; and in response to an indication that the at least one person disapproves the photo, sending to the user a prompt to capture a new photo.

3. The method of claim 2, further comprising sending the indication to the user.

4. The method of claim 2, further comprising enabling the user to verify the correctness of people recognized in the photo.

5. A system comprising: one or more processors; and logic encoded in one or more memory devices for execution by the one or more processors and when executed operable to perform operations comprising: recognizing one or more people from one or more faces in a photo including two or more faces captured by a user, wherein the recognizing is based at least in part on social connections, wherein the recognizing comprises: identifying the one or more faces of the one or more people in the photo; and applying a facial recognition algorithm to the one or more faces, wherein the facial recognition algorithm matches the one or more identified faces to respective faces of people who are socially connected to the user in a social network system; enabling the user to associate identifying labels with unrecognized faces by selecting people from a list of social connections in a social network; sending a copy of the photo to at least one person recognized in the photo, wherein the sending of the copy includes determining a device associated with the at least one person recognized in the photo, and sending the copy of the photo to the device; receiving, from the at least one person recognized in the photo, an indication of whether the at least one person approves the photo; and in response to an indication that the at least one person disapproves the photo, sending to the user a prompt to capture a new photo.

6. The system of claim 5, wherein the logic when executed is further operable to perform operations comprising sending the indication to the user.

* * * * *

UNITED STATES PATENT AND TRADEMARK OFFICE
CERTIFICATE OF CORRECTION

| | | |
|---|---|---|
| PATENT NO. | : 8,560,625 B1 | Page 1 of 1 |
| APPLICATION NO. | : 13/602134 | |
| DATED | : October 15, 2013 | |
| INVENTOR(S) | : Hardman et al. | |

It is certified that error appears in the above-identified patent and that said Letters Patent is hereby corrected as shown below:

On the Title page, item (75), the second inventor's name "Vian Shah" should read --Vinay Shah--

Signed and Sealed this
Twenty-second Day of April, 2014

Michelle K. Lee
*Deputy Director of the United States Patent and Trademark Office*